United States Patent
Chmielewski

(10) Patent No.: US 10,570,853 B2
(45) Date of Patent: Feb. 25, 2020

(54) THRUST REVERSER ASSEMBLY

(71) Applicant: MRA Systems, LLC, Baltimore, MD (US)

(72) Inventor: Cezary Chmielewski, Warsaw (PL)

(73) Assignee: MRA Systems, LLC, Norwalk, CT (US)

( * ) Notice: Subject to any disclaimer, the term of this patent is extended or adjusted under 35 U.S.C. 154(b) by 282 days.

(21) Appl. No.: 15/592,270

(22) Filed: May 11, 2017

(65) Prior Publication Data

US 2017/0328306 A1 Nov. 16, 2017

(30) Foreign Application Priority Data

May 12, 2016 (PL) .......................................... 417165

(51) Int. Cl.
*F02K 1/72* (2006.01)
*F01D 25/24* (2006.01)
*F02K 1/76* (2006.01)

(52) U.S. Cl.
CPC ................ *F02K 1/72* (2013.01); *F01D 25/24* (2013.01); *F02K 1/763* (2013.01); *F02K 1/766* (2013.01)

(58) Field of Classification Search
CPC ... F02K 1/763; F02K 1/72; F02K 1/62; F02K 1/625
See application file for complete search history.

(56) References Cited

U.S. PATENT DOCUMENTS

| 3,829,020 | A | * | 8/1974 | Stearns ..................... F02K 1/09 239/265.13 |
| 4,147,028 | A | | 4/1979 | Rodgers |
| 4,278,220 | A | | 7/1981 | Johnston et al. |
| 5,228,641 | A | | 7/1993 | Remlaoui |
| 7,124,981 | B2 | | 10/2006 | Parham |
| 7,874,142 | B2 | | 1/2011 | Beardsley |
| 9,322,360 | B2 | | 4/2016 | James |
| 2004/0195434 | A1 | * | 10/2004 | Parham ..................... F02K 1/62 244/11 |
| 2007/0234707 | A1 | * | 10/2007 | Beardsley ................. F02K 1/72 60/226.2 |

(Continued)

FOREIGN PATENT DOCUMENTS

EP    2 438 286 A1    4/2012
EP    2 573 375 A2    3/2013

(Continued)

OTHER PUBLICATIONS

Search Report issued in connection with corresponding PL Application No. 417165 dated Jul. 25, 2017.

(Continued)

*Primary Examiner* — Andrew H Nguyen
(74) *Attorney, Agent, or Firm* — McGarry Bair PC

(57) ABSTRACT

A thrust reverser assembly for a gas turbine engine including a core engine, a nacelle surrounding at least a portion of the core engine to define a bypass duct between the nacelle and the core engine, including a translating cowl moveable between a first position and a second position, a blocker door movable between a stowed position and a deployed position. The thrust reverser assembly includes multiple actuator assemblies to both translate the cowl and deploy the blocker door.

18 Claims, 6 Drawing Sheets

(56) References Cited

U.S. PATENT DOCUMENTS

2014/0131480 A1 5/2014 Hurlin et al.
2014/0373506 A1 12/2014 Kusel
2015/0285184 A1 10/2015 Sawyers-Abbott
2016/0160798 A1* 6/2016 Guerin ..................... F02K 1/09
　　　　　　　　　　　　　　　　　　　　　　239/265.19

FOREIGN PATENT DOCUMENTS

| | | |
|---|---|---|
| EP | 2 837 810 A1 | 2/2015 |
| EP | 2 957 754 A1 | 12/2015 |
| EP | 3 051 112 A1 | 8/2016 |
| WO | 2015/019007 A1 | 2/2015 |

OTHER PUBLICATIONS

Extended European Search Report and Opinion issued in connection with corresponding EP Application No. 17169552.1 dated Sep. 11, 2017.

\* cited by examiner

THRUST REVERSER ASSEMBLY

BACKGROUND

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Thrust reverser assemblies are used within turbine engines to provide a reverse thrust, for example, for deceleration. Reverse thrust is typically achieved by deploying a door assembly into a bypass duct which diverts air from flowing in an aft direction to flowing in a forward direction. The door assembly is deployed with an actuation assembly by moving a translating cowl to release the door into the bypass duct. Before actuation, it is beneficial for the bypass duct to be free of any spaces, gaps or other obstructions that may decrease efficiency of airflow through the bypass duct causing drag.

SUMMARY

In one aspect of the present disclosure, a gas turbine engine, comprising a core engine, a nacelle surrounding at least a portion of the core engine; a bypass duct defined by and between the nacelle and the core engine and defining a fore-to-aft air flow conduit, a translating cowl moveable between a first position and a second position, a cascade element located within the translating cowl when the translating cowl is in the first position, a blocker door movable between a stowed position, where the blocker door is located within a portion of the nacelle, and a deployed position, where the blocker door extends into the air flow conduit to deflect air through the cascade element, a first actuator assembly mechanically coupled to the translating cowl and selectively moving the translating cowl between the first and second positions and expose the cascade element when the translating cowl is in the second position, and a second actuator assembly mechanically coupled between the blocker door and one of the nacelle or the cascade element and selectively moving the blocker door between the stowed and deployed positions.

According to a second aspect of the present disclosure, a thrust reverser assembly for a gas turbine engine including a core engine, a nacelle surrounding at least a portion of the core engine to define a bypass duct between the nacelle and the core engine, including a translating cowl moveable between a first position and a second position, a blocker door movable between a stowed position wherein the blocker door is separated from the bypass duct and a deployed position, where the blocker door extends into the air flow conduit to deflect air through the cascade element, a first actuator assembly mechanically coupled to the translating cowl and selectively moving the translating cowl between the first and second positions and expose the cascade element when the translating cowl is in the second position, and a second actuator assembly mechanically coupled between the blocker door and one of the nacelle or the cascade element and selectively moving the blocker door between the stowed and deployed positions.

According to a third aspect of the present disclosure, a method of operating a thrust reverser system for an aircraft, comprising moving a translating cowl between a first position and a second position, deploying a blocker door from a stowed position to a deployed position, where the blocker door extends into an air flow conduit defined by a bypass duct defined by and between the nacelle and a core engine, redirecting bypassed air to exit out through a cascade element, and wherein thrust reverser forces are not applied to the translating cowl and the core engine.

DETAILED DESCRIPTION

Figure 1A:
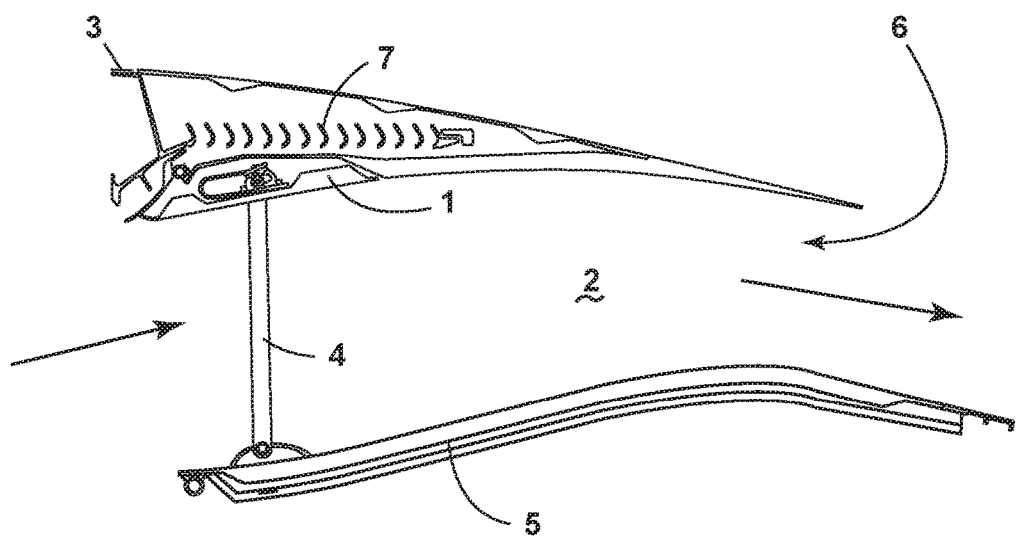
FIGS. 1A and 1B are isolated sectional views of a prior art example of a thrust reverser assembly in a first position 1A and a second position 1B.

The described aspects of the present disclosure are directed to a thrust reverser assembly, particularly in a gas turbine engine. For purposes of illustration, the present disclosure will be described with respect to an aircraft gas turbine engine. It will be understood, however, that the disclosure is not so limited and can have general applicability in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" refers to a direction toward the rear or outlet of the engine relative to the engine centerline.

Additionally, as used herein, the terms "radial" or "radially" refer to a dimension extending between a center longitudinal axis of the engine and an outer engine circumference.

It should be further understood that "a set" can include any number of the respectively described elements, including only one element.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the aspects described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1B:
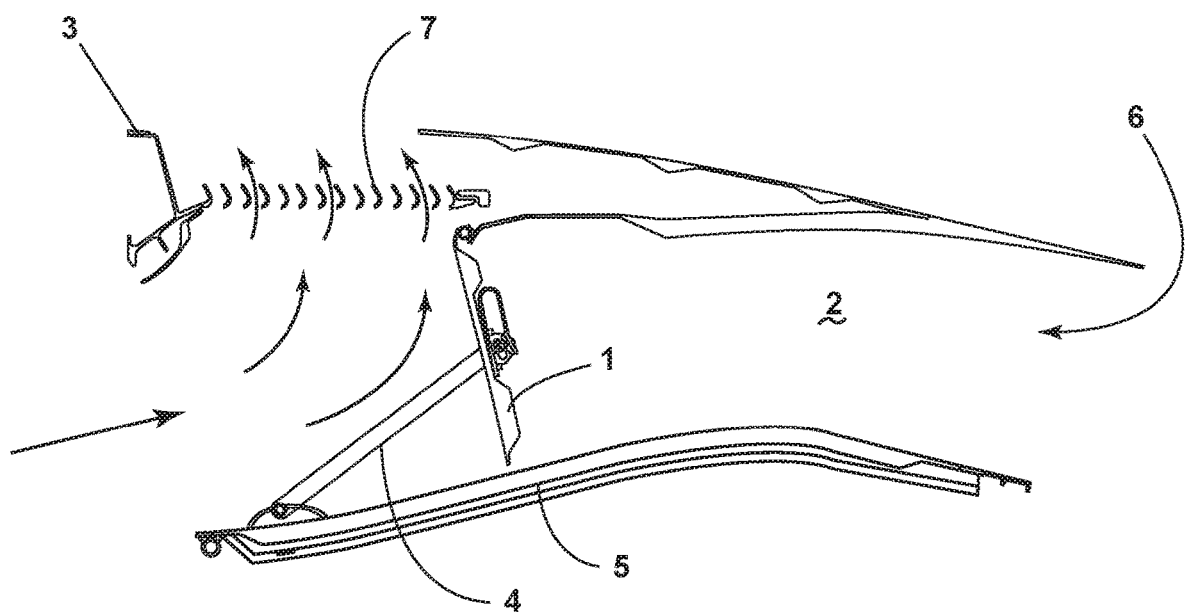

Deploying a blocker door 1 into a bypass duct 2 is known in the prior art as illustrated in FIG. 1A and FIG. 1B and will be briefly describe herein to give reference to problems faced by the prior art, which will later be used to explain benefits of the present disclosure. In the prior art, the hinged blocker door 1 can be mounted within a nacelle 3 and coupled to a pivoting arm 4 where the pivoting arm 4 is further mounted to an inner core cowl 5 providing a narrowing of the bypass duct 2. When deployed the blocker door 1 provides a thrust reversal effect of redirecting bypass air from an air conduit 6 through a cascade element 7. As illustrated in FIG. 1A, when the blocker door 1 is in a stowed position, the pivoting arm 4 remains in the bypass duct 2 which can create drag or force acting opposite the relative motion of an engine 10 during operation. As little or no drag is desirable, the pivoting arm 4 creates inefficiency, which causes more fuel to be burned than would otherwise be necessary.

Figure 2:
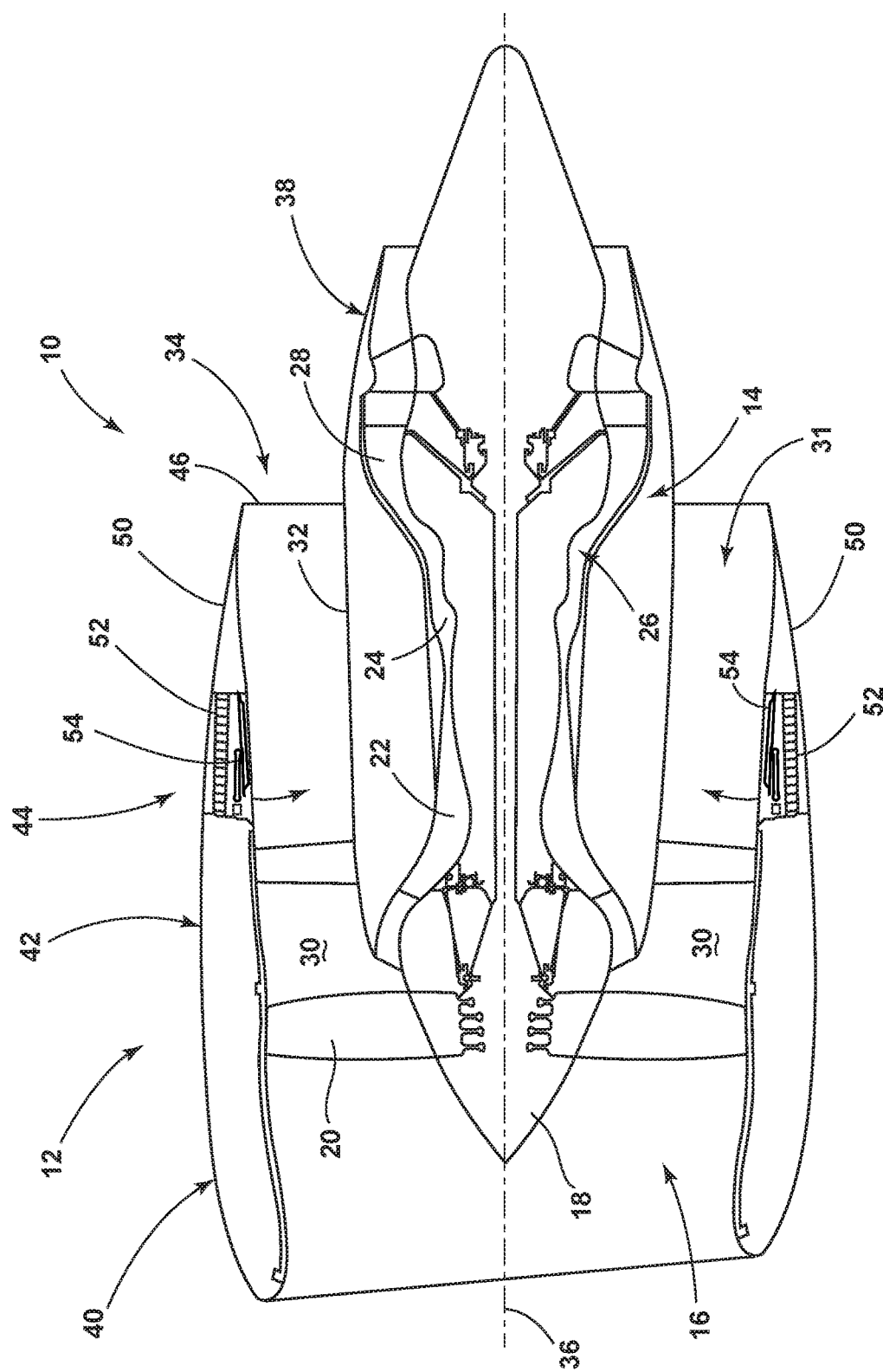
FIG. 2 is a schematic cross-sectional diagram of a gas turbine engine for an aircraft including a thrust reverser assembly in a first position.

FIG. 2 schematically represents a gas turbine engine 10 including a nacelle 12 surrounding at least a portion of a core engine 14. The engine 10 has a generally longitudinal extending axis or centerline 36 extending forward to aft. A fan assembly 16 located in front of the core engine 14 includes a spinner nose 18 projecting forwardly from an array of fan blades 20.

The core engine 14 is schematically represented as including a high-pressure compressor 22, a combustor 24, a high-pressure turbine 26 and a low-pressure turbine 28. A large portion of the air that enters the fan assembly 16 is bypassed to the rear of the engine 10 to generate additional engine thrust. The bypassed air passes through an annular-shaped bypass duct 30 defining a fore-to-aft air flow conduit 31 between the nacelle 12 and an inner core cowl 32, and exits the bypass duct 30 through a fan exit nozzle 34. The inner core cowl 32 defines the radially inward boundary of the bypass duct 30, and provides a smooth transition surface to a primary exhaust nozzle 38 that extends aft from the core engine 14. The nacelle 12 defines the radially outward boundary of the bypass duct 30. The bypassed fan air flows through the fore-to-aft air flow conduit 31 before being exhausted through the fan exit nozzle 34.

The nacelle 12 can include three primary elements that define the external boundaries of the nacelle 12: an inlet assembly 40, a fan cowl 42 interfacing with an engine fan case that surrounds the fan blades 20, and a thrust reverser assembly 44 located aft of the fan cowl 42. The thrust reverser assembly 44 includes three primary components: a translating cowl 50 mounted to the nacelle 12 and moveable between a first position (FIG. 2) and a second position (FIG. 3), a cascade 52 schematically represented within the nacelle 12, and blocker doors 54 adapted to be pivotally deployed from the stowed positions shown in FIG. 2. The blocker doors 54 are radially inward from the cascade 52. While two blocker doors 54 are shown in FIG. 2, a set of blocker doors 54 are typically circumferentially spaced around the nacelle 12.

Figure 3:
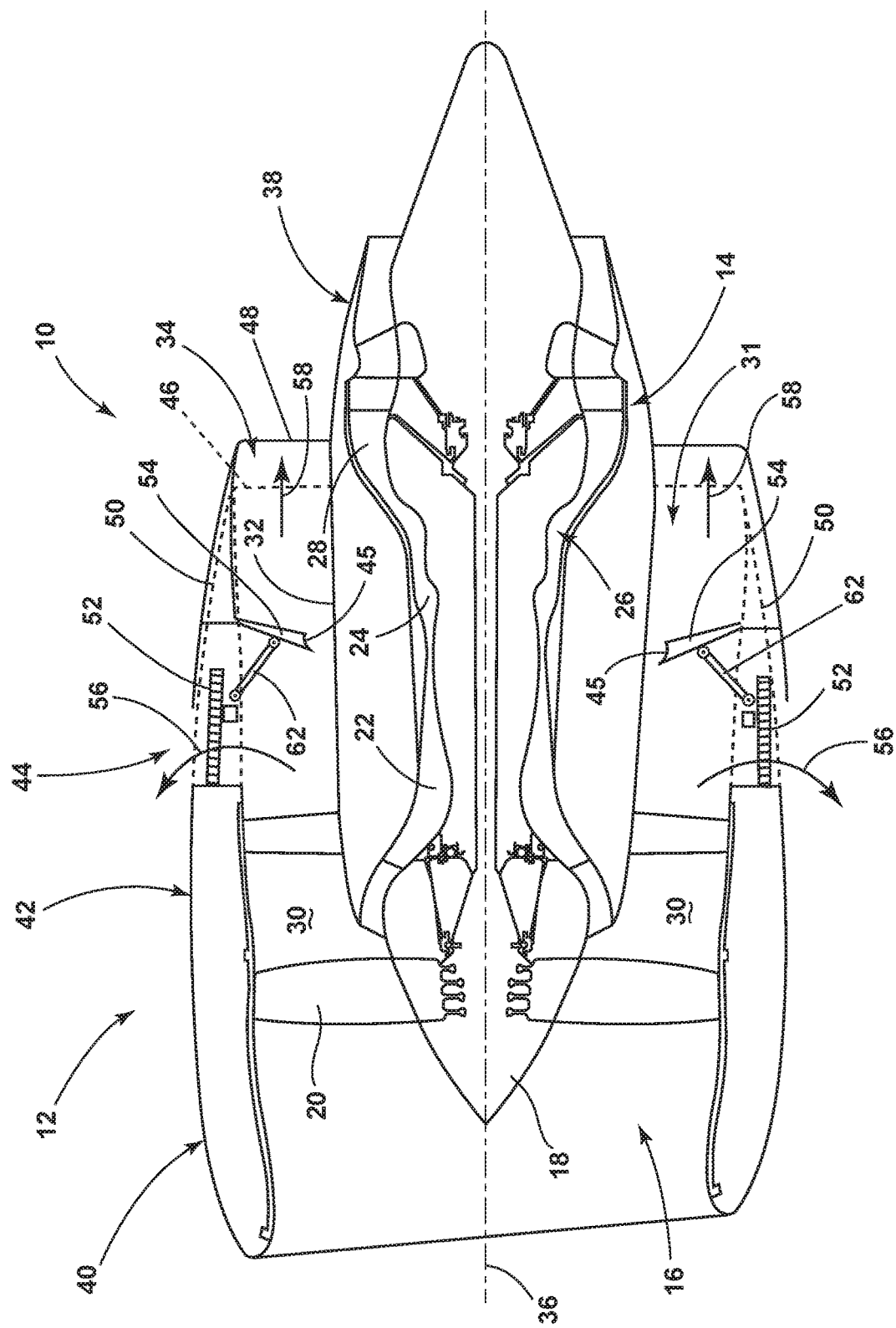
FIG. 3 is a schematic cross-sectional diagram of a gas turbine engine for an aircraft including a thrust reverser assembly in a second position.

FIG. 3 is a second schematic representation of the gas turbine engine 10 with the thrust reverser assembly 44 in the deployed position. The translating cowl 50 has been selectively moved in the aft direction 58 between a first position 46 (shown in phantom) and a second position 48. The movement of the translating cowl 50 in the aft direction 58 can expose the cascade element 52.

The cascade element 52 is a fixed structure of the nacelle 12, meaning that the cascade 52 does not move during the operation of the thrust reverser assembly 44. The cascade element 52 can have deflecting devices or thrust reverser profiles to direct bypassed air exiting 56 forward of the engine 10 when the thrust reverser assembly 44 is in the deployed position.

The blocker door 54 is adapted to deploy from the stowed position, shown in FIG. 2, to the fully deployed position shown in FIG. 3. A link arm 62 can be coupled to the blocker door 54 to aid in moving the blocker door 54 between the stowed position (FIG. 2) and the deployed position, where the blocker door 54 extends into the air flow conduit 31. The inner core cowl 32 of the core engine 14 is also part of the thrust reverser assembly 44. The fore end 45 of the blocker door 54 is pivoted toward the inner core cowl 32 such that the fore end 45 is adjacent the inner core cowl 32 when the blocker door 54 is fully deployed causing bypassed air within the bypass duct 30 to be diverted through the exposed cascade 52 and thereby provide a thrust reversal effect. It should be noted that the inner core cowl 32 as described herein provides a smooth and linear pathway for the fore-to-aft air flow conduit 31 wherein the smooth transition surface path provided by the inner core cowl 32 transitions towards the exhaust nozzle 38 without first forming a narrow path as is illustrated in the prior art (FIG. 1).

Figure 4:
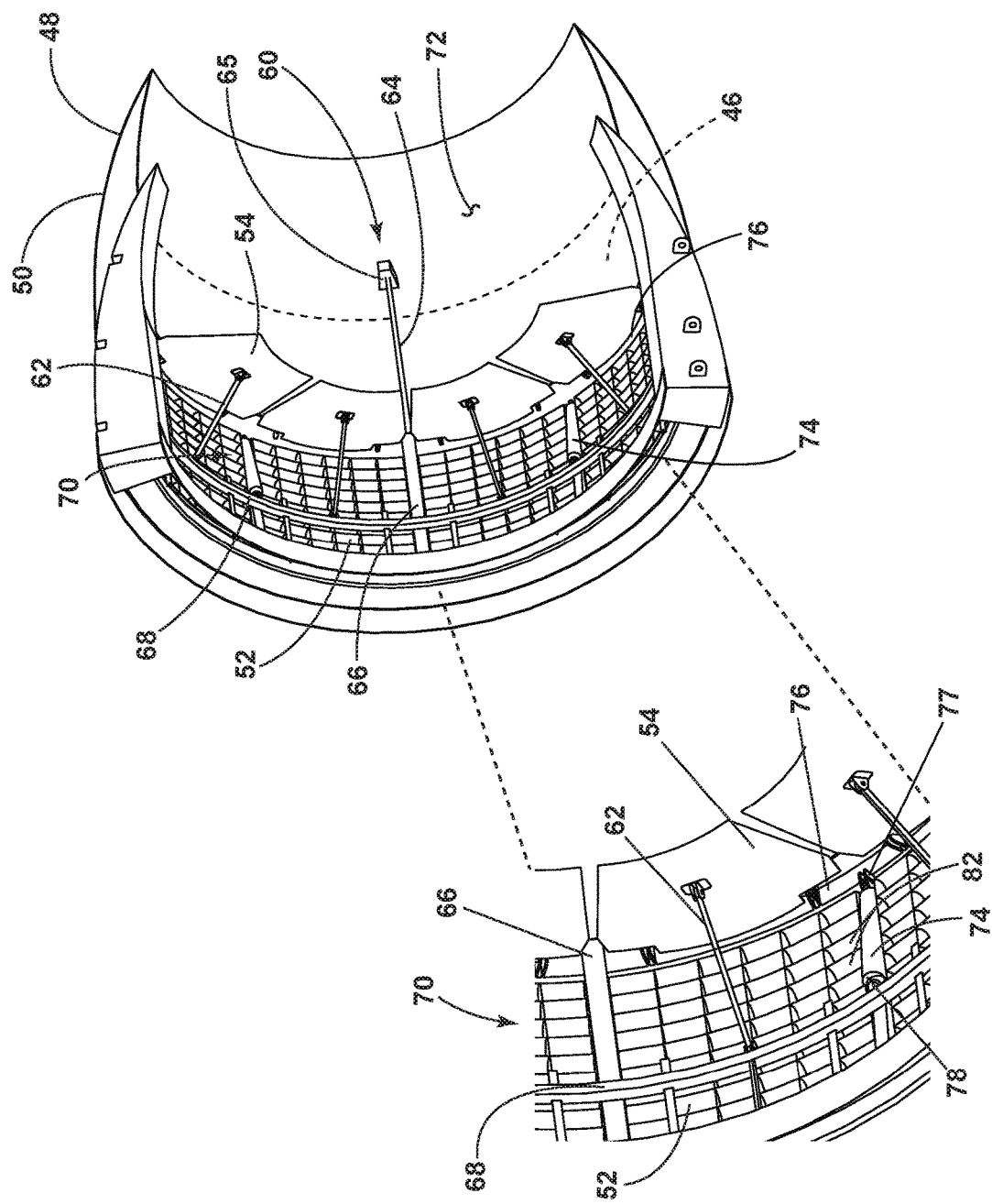
FIG. 4 is a perspective view of a portion of the thrust reversal assembly in the second position with a call-out of portion of the thrust reversal assembly.

FIG. 4 is a perspective view of a portion of the thrust reversal assembly 44 with the circumferentially spaced blocker doors 54 in the deployed position. A first actuator assembly 60 is mechanically coupled to the translating cowl 50 to selectively move the translating cowl 50 from the first position 46 (FIG. 2) to the second position 48 when a signal from a controller is received and before the blocker doors 54 are deployed. The first actuator assembly 60 can comprise a sliding portion 64 received within a body of a linear actuator 66 that can be mounted to a sliding ring 68 of the cascade element 52. The sliding portion 64 is secured at a leading end to a fixed structure 65 that can be mounted to an inner wall 72 of the translating cowl 50. Multiple actuator assemblies for translating the translating cowl 50 aft can be circumferentially arranged and mounted to the cascade element 52, or at any suitable location within the nacelle 12.

A second actuator assembly 70, independently operable from the first actuator assembly 60, is illustrated in more detail in the call out portion of FIG. 4. The second actuator assembly 70 has been illustrated as including three main components: the link arm 62 coupled to the sliding ring 68 that is further coupled to a linear actuator 74. The linear actuator 74 may be any suitable type of actuator that creates a linear output motion. It will be understood that this need not be the case and that the second actuator assembly 70 can be formed and coupled to the blocker door 54 in any suitable manner. It will be further understood that both the linear actuator 66 and the linear actuator 74 can be pneumatic, hydraulic or electrically driven. The electrically driven approach can include reduced system complexity and increased controllability.

Each blocker door 54 can be connected to a fixed portion 76 of the cascade element 52 with a rotating element 77 mechanically coupled to the linear actuator 74. Alternatively the fixed portion 76 could be part of the nacelle 12 while still located aft of the cascade element in order to maintain a pathway for bypassed air 56 so as not to impart unnecessary forces on the translating cowl 50.

The link arm 62 is pivotally mounted to the blocker door 54 and the sliding ring 68 with, for example but not limited to, a clevis mounting bracket or any other suitable pivoting bracket known in the art. The link arm 62 can be formed from steel and when in the stowed position (FIG. 2) is folded in and up behind the blocker door 54 next to the cascade element 52.

The first actuator assembly 60 moves from the first position 46 when the sliding portion 64 slides aft and pushes the translating cowl 50 to the second position 48. In the same manner, the sliding portion 64 can slide forward into the body of the linear actuator 66 pulling the translating cowl from the second position 48 to the first position 46 when a second signal is received from the controller under conditions where slowing or braking of the aircraft is no longer necessary.

The output of the linear actuator 74 determines the movement of the corresponding parts of the second actuator assembly 70. More specifically, in order to rotate the blocker door 54 from the stowed position, where the blocker door 54 is located within a portion of the nacelle 12, to the deployed position, the linear actuator 74 slides parallel to the cascade element 52 along a slideable element 78 simultaneously bringing the sliding ring 68 towards the fixed portion 76. Movement of the sliding ring 68 towards the fixed element 76 causes the link arm 62 to move from a parallel position between the blocker door 54 and the cascade element 52 to an angled position where the blocker door 54 is nearly perpendicular to the fixed cascade element 52.

In the second position 48, the cascade element 52 is fully exposed. The cascade element 52 can include a plurality of outlets 82 housing the deflecting devices and through which the bypass air 56 can pass.

The rotating and sliding joints of the blocker door 54 are geometrically and physically designed to provide a desired sequence and rate of deployment for the blocker doors 54. In the deployed position, multiple blocker doors 54 can be configured to interface together to yield a desired percentage of duct blockage, which can be further optimized by seals provided along the edges of the blocker doors 54.

Figure 5A:
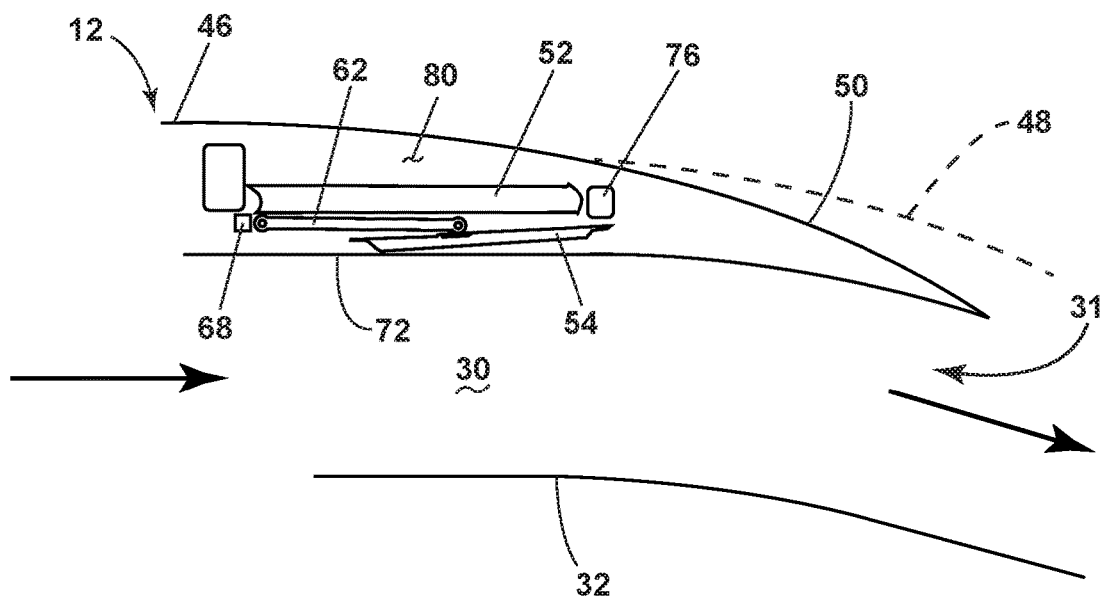
FIGS. 5A and 5B are isolated sectional views of the thrust reverser assembly in the first position 5A and second position 5B of FIG. 2 and FIG. 3, respectively.

FIG. 5A schematically illustrates a cross sectional view of the thrust reverser assembly 44 when in the stowed position. When compared to FIG. 4A, a benefit of the design described herein of allowing bypass air to flow through the bypass air conduit 31 free from any obstructions or turns becomes apparent. In turn a clear bypass air duct 30 decreases drag and increases fuel efficiency.

Figure 5B:
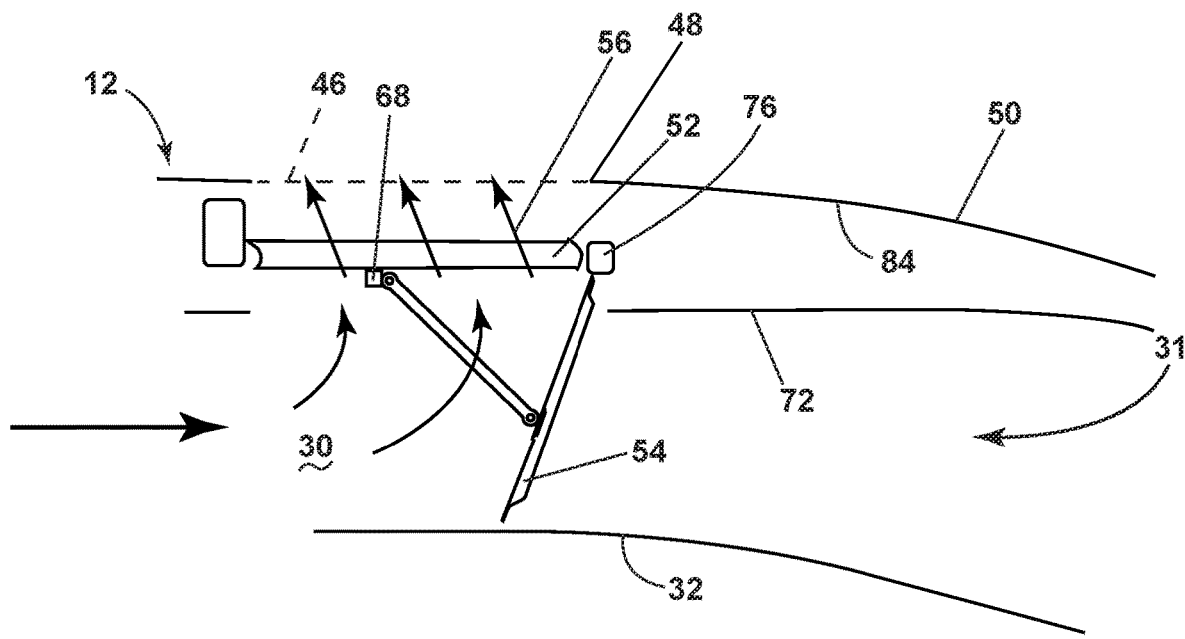

From FIG. 5B, it can be appreciated that, when fully deployed, the blocker door 54 extends across the entire, substantially the entire, or almost the entire, radial width of the bypass duct 30 and causes bypassed air within the bypass duct 30 to be diverted through the exposed cascade element 52 and thereby provide a thrust reversal effect. Redirecting the bypassed air into a forward direction produces a force in the opposite direction of travel to ensure deceleration.

Prior to translation of the translating cowl 50 (e.g., while the thrust reverser assembly 44 is not in use), the stowed blocker door 54 is positioned radially inward of the cascade 52, and both the cascade 52 and blocker door 54 are completely concealed by the translating cowl 50.

More particularly, the cascade 52 and blocker door 54 are contained within a cavity 80 defined between radially inner and outer walls 72, 84 of the translating cowl 50, such that the radially inner wall 72 of the translating cowl 50 completely separates the cascade 52 and blocker door 54 from the bypass duct 30. The inner wall 72 of the translating cowl 50 defines a portion of the radially outer flow surface of the bypass duct 30. The blocker door 54 does not define any portion of the radially outer flow surface of the bypass duct 30 during normal engine operation, and therefore does not create surface interruptions (gaps and steps) or cause duct leakage. Furthermore, the blocker door 54 is not exposed to damage and wear-inducing conditions during normal in-flight engine operations. Another advantage is that the entire inner wall 72 of the translating cowl 50 can incorporate an uninterrupted acoustic treatment (not shown) of its entire surface area to promote increased engine noise attenuation.

Figure 6:
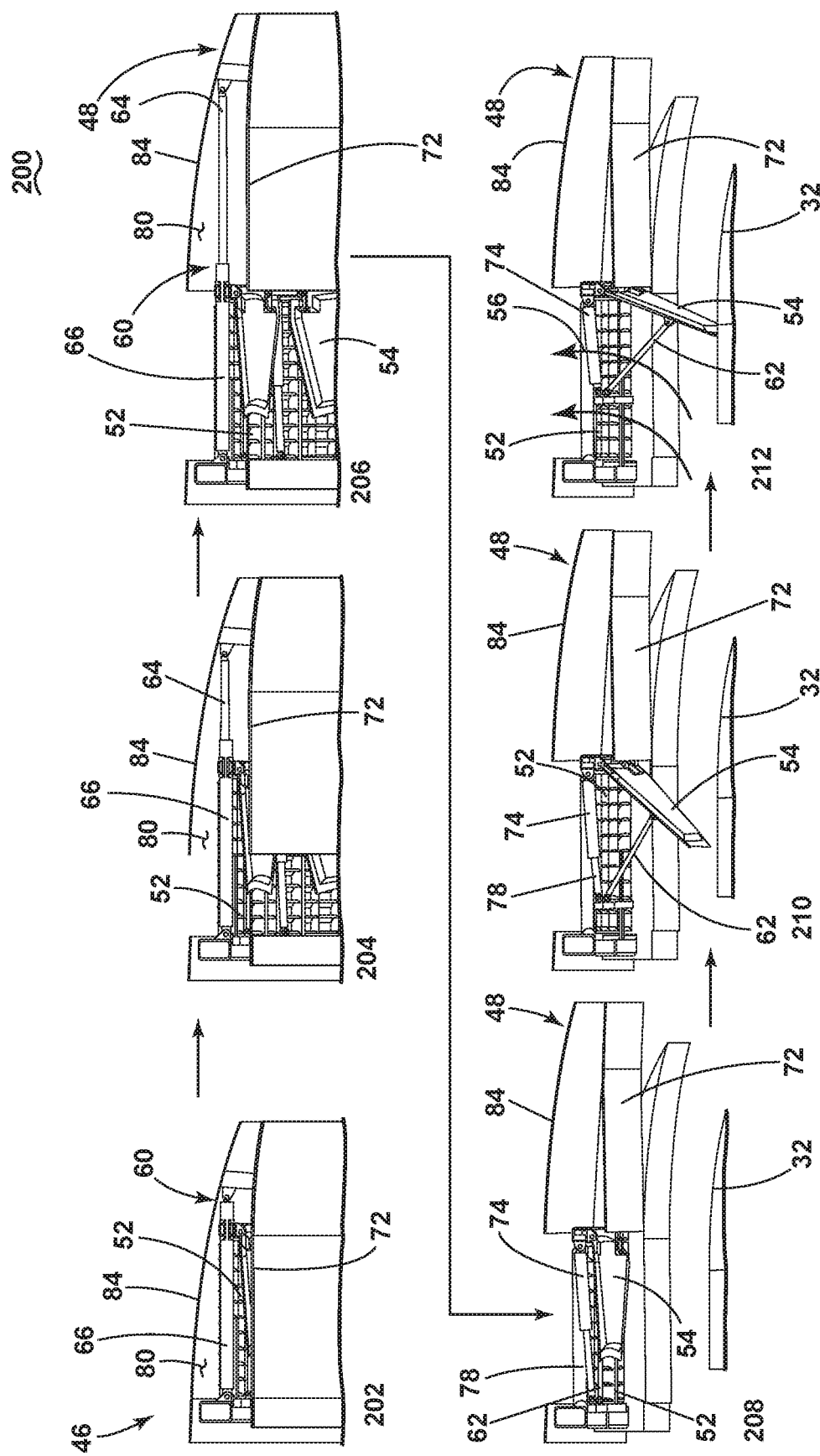
FIG. 6 is an isolated sectional view of the thrust reverser assembly in a sequence of snapshots from the first position to the second position.

In FIG. 6 a sequence of snapshots of a portion of the gas turbine engine 10, when the thrust reverser assembly 44 is moved between the first position 46 and the second position 48 is illustrated. This includes an illustration of translation of the translating cowl 50 by the first actuator assembly 60 along with the corresponding stowed and deployed positions of the blocker door 54 as caused by the second actuator assembly 70. While the second actuator assembly 70 is operable independent of the first actuator assembly 60, movement of the second actuator assembly 70 is dependent on the extent to which the first actuator assembly 60 has moved the translating cowl 50 from the first position 46 to the second position 48. Only when the first actuator assembly 60 has substantially completed translation of the translating cowl 50 or translated to an extent that the blocker door deployment will not be hindered, will the second actuator assembly 70 begin deployment.

The controller module (not shown) can be operably coupled to the thrust reverser assembly 44 to control its operation. The controller can receive a signal from a user, for example a pilot of an aircraft, when thrust reverser force is necessary to slow or brake the aircraft and a second signal when thrust reverser forces are no longer necessary. The signal can be sent to the first actuator assembly 60 and then to the second actuator assembly 70 or both simultaneously. As described herein, the movement of each actuator assembly 60, 70 is dependent on the other in that when a signal is received from the controller, the first actuator assembly 60 translates the translating cowl 50 and then the second actuator assembly 70 deploys the blocker door 54. Upon receiving the second signal, the second actuator assembly 70 stores the blocker door 54 and the first actuator assembly 60 translates the translating cowl 50 to a closed position. It will be understood that the controller module can include one or more processors to operate the movement of the thrust reverser assembly 44.

FIG. 6 pictorially illustrates a method 200 of operating a thrust reverser system such as the thrust reverser assembly 44. The method 200 includes the thrust reverser assembly 44 in a non-use position at 202 and first moving 204 and 206 of the translating cowl 50 in the aft direction 58. More specifically, at 204 the first actuator assembly 60 pushes the translating cowl 50 to the second position 48, as shown at 206, which leaves the cascade 52 exposed. Then upon completion of moving the translating cowl 50 aft, deploying the blocker door 54 from a stowed position, illustrated at 208, to a deployed position, shown at 212, commences. The blocker door is shown at a partially extended position at 210. When the thrust reverser assembly 44 is at the use position as illustrated at 212, any bypass airflow in the bypass duct 30 is redirected, as illustrated by arrows 56, to exit out through the cascade element 52.

It should be appreciated that the operation of the blocker doors and their guided and rotating connections are not dependent on any particular type of cascade design, and in fact the embodiments of the present disclosure could be installed in a non-cascade thrust reverser assembly design in which the bypassed air is diverted from the bypass duct through openings of various configurations. Furthermore, whereas the blocker door 54 is shown with a rigid construction that does not intentionally bend, flex or fold during its deployment, blocker doors having any of these capabilities are also within the scope of the present disclosure. It should be further understood that an extended length blocker door or folding door that extends as it is deployed can be utilized to provide a blocker door that, when deployed, is capable of extending into the external air flow to provide additional retarding drag. Finally, it should also be appreciated that the thrust reverser assembly 44 and its individual components can be constructed of various materials, including metallic, plastic and composite materials commonly used in aerospace applications and fabricated by machining, casting, molding, lamination, etc., and combinations thereof.

In any of the above various aspects, a protective coating, such as a thermal barrier coating, or multi-layer protective coating system can be applied to the cowls or engine components.

The various aspects of systems, methods, and other devices related to the present disclosure herein provides an improved thrust reverser assembly, particularly in a fan cowl. Conventional thrust reverser assemblies utilize a blocker door coupled to an actuation system. However, the actuation system must have enough structural integrity to support the load created by the force of the airflow against the blocker door as it opens within the bypass duct, requiring a larger actuation system. In the present disclosure, any thrust reverser forces are not applied to the translating cowl or the core engine. As such, a smaller load is borne by the actuation system, allowing a lighter, smaller actuation system, decreasing the weight of the system and creating additional room within the nacelle structure.

Benefits include low air drag and a higher proficient ratio, around 50%, of acoustic area to wetted area near 50% due to the removal of a link arm and any steps or gaps in the fan duct conduit. Removal of the link arm within the fan duct and replacement with a smaller link arm mechanism decreases the overall weight of the thrust reversal assembly. The disclosed thrust reverser assembly also prevents thrust reverser forces from being unnecessarily applied to the translating cowl or core cowl.

The disclosed thrust reverser assembly reduces part count, simplifies structure, and can be applied to a wide range of engines, including but not limited to all high-bypass commercial and military engines. The disclosed assembly also provides for good access to all components which allows for efficient repair time when necessary.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine, comprising:
   a core engine;
   a nacelle surrounding at least a portion of the core engine;
   a bypass duct defined by and between the nacelle and the core engine and defining a fore- to-aft air flow conduit;
   a translating cowl moveable between a first position and a second position;
   a cascade element located within the translating cowl when the translating cowl is in the first position, wherein the cascade element is a fixed structure;
   a blocker door movable between a stowed position, where the blocker door is located within a portion of the nacelle, and a deployed position, where the blocker door extends into the air flow conduit to deflect air through the cascade element;
   a first actuator assembly mechanically coupled to the translating cowl and selectively moving the translating cowl between the first and second positions and exposing the cascade element when the translating cowl is in the second position; and
   a second actuator assembly independently operable from the first actuator assembly, mechanically coupled between the blocker door and the cascade element and selectively moving the blocker door between the stowed and deployed positions;
   wherein the second actuator assembly comprises:
   a sliding ring surrounding the core engine and slidable along at least a portion of a length of the cascade element; and
   at least one link arm mechanically coupling the sliding ring to the blocker door.

2. The gas turbine engine of claim 1 wherein the second actuator assembly is operable independently of the first actuator assembly.

3. The gas turbine engine of claim 1 wherein the blocker door is rotatably mounted to a part of the cascade element.

4. The gas turbine engine of claim 1 wherein the second actuator assembly further comprises a linear actuator.

5. The gas turbine engine of claim 4 wherein the sliding ring is slidable based on output provided by the linear actuator.

6. The gas turbine engine of claim 5, wherein the blocker door is one of multiple blocker doors circumferentially spaced about the core engine and wherein the multiple blocker doors are operably coupled to the sliding ring.

7. A thrust reverser assembly for a gas turbine engine including a core engine, a nacelle surrounding at least a portion of the core engine to define a bypass duct between the nacelle and the core engine, including:
   a translating cowl moveable between a first position and a second position;
   a blocker door movable between a stowed position wherein the blocker door is separated from the bypass duct and a deployed position, where the blocker door extends into the bypass duct to deflect air through a cascade element, wherein the cascade element is a fixed structure;
   a first actuator assembly mechanically coupled to the translating cowl and selectively moving the translating cowl between the first and second positions and exposing the cascade element when the translating cowl is in the second position; and
   a second actuator assembly, independently operable from the first actuator assembly, mechanically coupled between the blocker door and the cascade element and selectively moving the blocker door between the stowed and deployed positions;
   wherein the second actuator assembly comprises:
   a sliding ring surrounding the core engine and slidable along at least a portion of a length of the cascade element; and at least one link arm mechanically coupling the sliding ring to the blocker door.

8. The thrust reverser assembly of claim 7, wherein the cascade element is located within the translating cowl when the translating cowl is in the first position.

9. The thrust reverser assembly of claim 7 wherein the blocker door is rotatably mounted to a part of the cascade element.

10. The thrust reverser assembly of claim 7 wherein the second actuator assembly further comprises a linear actuator.

11. The thrust reverser assembly of claim 10 wherein the sliding ring operably coupled to the linear actuator and where the sliding ring is slidable along at least the portion of the length of the cascade element based on output provided by the linear actuator.

12. The thrust reverser assembly of claim 11 wherein the second actuator assembly further comprises a link arm mechanically coupling the sliding ring to the blocker door.

13. The thrust reverser assembly of claim 11, wherein the blocker door is one of multiple blocker doors circumferentially spaced about the core engine.

14. The thrust reverser assembly of claim 13 wherein the multiple blocker doors are operably coupled to the sliding ring via separate link arms.

15. The thrust reverser assembly of claim 7, further comprising an uninterrupted acoustic treatment on an inner wall of the translating cowl.

16. A method of operating a thrust reverser system for an aircraft, comprising:
    moving a translating cowl between a first position and a second position to expose a cascade element with a first actuator assembly;
    moving a sliding ring toward the translating cowl along a length of the cascade element with a second actuator assembly independently operable from the first actuator assembly, wherein the sliding ring surrounds a core engine;
    deploying a blocker door mechanically coupled to the sliding ring via a link arm from a stowed position to a deployed position, where the blocker door extends into an air flow conduit defined by a bypass duct defined by and between a nacelle and the core engine; and
    redirecting bypassed air to exit out through the cascade element;
    wherein thrust reverser forces are not applied to the translating cowl or the core engine.

17. The method of claim 16 wherein the blocker door in the stowed position is located within a portion of the nacelle or the translating cowl.

18. The method of claim 17 wherein no link arms are located in the bypass duct when the blocker door is located in the stowed position.

* * * * *